US011674291B2

United States Patent
Rol Corredor et al.

(10) Patent No.: US 11,674,291 B2
(45) Date of Patent: Jun. 13, 2023

(54) METHOD OF FIXING A WEAR ELEMENT ON THE FRONT EDGE OF A SUPPORT AND CORRESPONDING FIXING MEANS

(71) Applicant: METALOGENIA RESEARCH & TECHNOLOGIES S.L., Barcelona (ES)

(72) Inventors: Javier Rol Corredor, Sant Adrià del Besós (ES); Sergio Lopez Requejo, Mataró (ES); Francesc Picon Manjon, El Masnou (ES); Angel Martinez Mane, Mataró (ES); Francisco Perez Soria, La Roca del Vallès (ES); Jorge Triginer Boixeda, Barcelona (ES); Nuria Roca, Santa Coloma de Gramenet (ES); David Ibanez Cotado, Montornès del Vallès (ES)

(73) Assignee: METALOGENIA RESEARCH & TECHNOLOGY S.L., Barcelona (ES)

( * ) Notice: Subject to any disclaimer, the term of this patent is extended or adjusted under 35 U.S.C. 154(b) by 616 days.

(21) Appl. No.: 16/629,064

(22) PCT Filed: Jul. 4, 2018

(86) PCT No.: PCT/EP2018/068072
§ 371 (c)(1),
(2) Date: Jan. 7, 2020

(87) PCT Pub. No.: WO2019/008022
PCT Pub. Date: Jan. 10, 2019

(65) Prior Publication Data
US 2020/0291621 A1    Sep. 17, 2020

(30) Foreign Application Priority Data

Jul. 7, 2017  (EP) ..................................... 17382445

(51) Int. Cl.
*E02F 9/28* (2006.01)

(52) U.S. Cl.
CPC .......... *E02F 9/2833* (2013.01); *E02F 9/2825* (2013.01)

(58) Field of Classification Search
CPC ....... E02F 9/2816; E02F 9/285; E02F 9/2858; E02F 9/1833; E02F 9/2825
See application file for complete search history.

(56) References Cited

U.S. PATENT DOCUMENTS

| 3,012,346 A | * | 12/1961 | Larsen | .................. E02F 9/2841 37/457 |
| 5,331,754 A | * | 7/1994 | Ruvang | ................. E02F 9/2841 37/457 |

(Continued)

FOREIGN PATENT DOCUMENTS

AU            48865 A        8/2002

OTHER PUBLICATIONS

International Search Report, PCT/EP2018/068072, dated Sep. 10, 2018.

*Primary Examiner* — Jessica H Lutz
(74) *Attorney, Agent, or Firm* — Porzio Bromberg & Newman P.C.

(57) ABSTRACT

The invention relates to a method of fixing a wear element (2) on the front edge of a support (1) using fixing means, where the wear element (2) comprises two arms (3) with first through openings (4) and the support (1) has a second through opening (5) sandwiched between the first through openings (4). The fixing means comprise a C-shaped first body (6), a wedge (14), ratchet means (24) between both and a second body (8), which are housed in the openings in an assembled position. The method consists of positioning the first body (6) and the second body (8) in the openings, inserting the wedge (14) between both, positioning a screw (Continued)

(21) between the wedge (14) and the second body (8) and screwing it in such a way that the wedge (14) moves with respect to the second body (8) and the first body (6) until the wedge (14) reaches its assembled position, and at least partially unscrewing the screw (21) and removing the screw (21) from the fixing means.

17 Claims, 7 Drawing Sheets

(56) References Cited

U.S. PATENT DOCUMENTS

| | | | |
|---|---|---|---|
| 5,410,826 A | 5/1995 | Immel et al. | |
| 7,516,564 B2* | 4/2009 | Ruvang | E02F 9/2833 37/456 |
| 8,302,333 B2* | 11/2012 | Ruvang | E02F 9/2825 37/455 |
| 8,458,931 B2* | 6/2013 | Knight | E02F 9/2833 37/456 |
| 9,200,433 B2* | 12/2015 | Tasovski | E02F 9/2833 |
| 9,228,325 B2* | 1/2016 | Campomanes | E02F 9/2825 |
| 9,353,505 B2* | 5/2016 | Pilon | E02F 9/2883 |
| 9,874,001 B2* | 1/2018 | Lombardo | E02F 9/2825 |
| 9,932,723 B2* | 4/2018 | Triginer Boixeda | E02F 9/2833 |
| 9,951,500 B2* | 4/2018 | Kunz | E02F 9/2833 |
| 9,957,696 B2* | 5/2018 | Kunz | F16B 37/14 |
| 11,286,651 B2* | 3/2022 | Rol Corredor | E02F 9/2833 |
| 2011/0061271 A1 | 3/2011 | Bierwith | |
| 2013/0247429 A1* | 9/2013 | Campomanes | E02F 9/2833 37/456 |

* cited by examiner

METHOD OF FIXING A WEAR ELEMENT ON THE FRONT EDGE OF A SUPPORT AND CORRESPONDING FIXING MEANS

FIELD OF THE INVENTION

The invention relates to a method of fixing a wear element on the front edge of a support using fixing means. The wear element comprises two arms extending backwards opposite one another, leaving a space therebetween for housing the front edge, thereby defining an assembled position, where the arms have first through openings facing one another and the support has a second through opening which is sandwiched between the first through openings in the assembled position. The first and second through openings thereby define an axis of assembly. By way of preferred examples, the support is the lip of a bucket of an earth moving machine or an adaptor on which a tooth will be assembled, and the wear element can be the corresponding tooth or adaptor (preferably a Whisler-type adaptor). The fixing means comprise a C-shaped first body (normally referred to as a C-clamp), a wedge and a second body (normally also referred to as a counter wedge), where in the assembled position, the first body, the wedge and the second body are housed in the openings, the wedge being located between the first body and the second body. In the assembled position, there is located between the wedge and the second body a hollow space suitable for housing the shank of a screw. This hollow space defines a shank axis coinciding with the axis of the shank.

The invention also relates to fixing means for fixing a wear element on the front edge of a support, where the wear element comprises two arms extending backwards opposite one another, leaving a space therebetween for housing the front edge, thereby defining an assembled position, where the arms have first through openings facing one another and the support has a second through opening which is sandwiched between the first through openings in the assembled position. The first and second through openings define an axis of assembly in this assembled position. The fixing means comprise a C-shaped first body, a wedge and a second body. In the assembled position, the first body, the wedge and the second body are housed in the openings, the wedge being located between the first body and the second body, and there is located between the wedge and the second body a hollow space suitable for housing the shank of a screw. This hollow space defines a shank axis coinciding with the axis of the shank.

When, in the present specification and claims, it Is said that the shank axis of the hollow space and the axis of the shank are coincident, it means that both axes are coincident at all points thereof, i.e., they are one same line in the space.

STATE OF THE ART

It is common for earth moving machines to use wear elements, such as teeth or assemblies comprising a tooth plus an adaptor on the lips of buckets, for example. These wear elements have a limited service life, and are furthermore prone to experiencing breakages, so it is common to have to replace them many times. As a result, a plurality of fixing systems for fixing same has been developed. In smaller-sized machines, it is common for adaptors to be welded to the lip (also referred to as blade) of the bucket, but in larger-sized machines (for example, those used in mining), it is common for the adaptors to be mechanically fixed to the lip in a reversible manner.

Two families of fixing means are commonly used for fixing Whisler-type wear elements. A first family basically consists of a two-piece assembly: a C-shaped first body (normally referred to as a C-clamp) and a wedge, whereas the second family basically consists of three parts: a C-shaped first body, a wedge and a second body (normally also referred to as a counter wedge). In both cases, there are normally two variants: the wedge is introduced in one of them by means of a hammer or the like, whereas in the other variant the fixing means also include a screw or the like which allows introducing the wedge into its fixing position when screwed into a threaded element fixed to one of the other elements. Patent document U.S. Pat. No. 8,720,088 shows one example of fixing means formed by two parts: a first C-shaped body (reference 32) and a wedge (reference 38). A nut (reference 50) may move along a rectangular space (36) thanks to the rotation of a screw (46) which is fixedly attached to the wedge by means of a ridge (44) of the wedge and the groove (48) of the screw. The nut (50) is permanently in contact with the wedge (38), such that there is no hollow space between them. Two variants are offered in this document, in one of them, shown in FIG. 3, the wedge may move freely relative to the first body (in both directions: up and down) as far as the ends of the rectangular space (36). In the variant shown in FIG. 4, in the rectangular space there are teeth (78) which engage teeth (76) disposed on the nut. In this case, when assembling the unit, both sets of teeth engage each other, whereby the relative position of the nut to the first body is blocked, with no possibility of movement, either upward or downward. Other examples of these systems can be found in patent documents EP 2,913,441 A1, U.S. Pat. No. 5,410,826 A or U.S. Pat. No. 8,302,333 B2. Given that Whisler-type adaptors are normally fixed using fixing means such as those indicated, the fixing means are also normally referred to as Whisler-type fixing means.

However, there is still a need to improve these fixing means. These fixing means are relatively expensive and complex in general since they must meet various requirements. Furthermore, they are made of expensive materials (alloyed steels), and yet they have a limited service life and must be frequently replaced. Therefore there is still interest in any improvement which entails saving in material, making changes easily or rapidly, higher strength or durability, lower risk of detachment due to breakage, etc.

DESCRIPTION OF THE INVENTION

The object of the invention is a method of fixing of the type indicated above, characterized in that it comprises the following steps:
  positioning the first body and the second body in the openings in their assembled position, where, preferably, in the assembled position, the first body and the second body do not move with respect to one another in the direction of the axis of assembly,
  inserting the wedge between the first body and the second body, where between the first body and the wedge there are ratchet means suitable for allowing relative movement between the wedge and the first body according to the axis of assembly and a downward direction and suitable for blocking the relative movement between the wedge and the first body according to the axis of assembly and an upward direction,
  positioning a screw in the hollow space with its head in contact with a support surface and with its threaded end on a threaded surface, where the support surface is suitable for moving together with the wedge and the threaded surface moves together with the second body, or alternatively, the support surface moves together with the second body and the threaded surface is suitable for moving together with the wedge, screwing the screw into the threaded surface such that the wedge moves, according to the axis of assembly, with respect to the second body and the first body until the wedge reaches its assembled position, at least partially unscrewing the screw from the threaded surface, freeing the screw from the second body and the wedge and removing the screw from the fixing means.

In fact, the method according to the invention provides the advantages of a fixing system that does not require a hammer or the like for fixing the wear element (systems normally referred to as hammerless systems), and yet it is possible to remove the screw once the wear element is fixed. In conventional systems, the screw must be screwed to the fixing means. This can cause problems, for example, if during use, it bends or the threading is damaged, since it would hinder later removal of the fixing means. In addition, conventional screws are for a single use, and each fixing system necessarily comes with its screw which is later discarded. The screw can be reutilized with the system according to the invention.

As will be seen in greater detail in the embodiments, there are at least two preferred embodiments of the invention:

a) In a first preferred embodiment, the support surface is suitable for moving together with the wedge and the threaded surface moves together with the second body. The threaded surface advantageously defines a screwing axis coinciding with the shank axis. This first preferred embodiment in turn has two advantageous alternatives: in one alternative the threaded surface is arranged in a threaded opening in the second body; in the other alternative the threaded surface is arranged in a nut that is solidly joined with said second body. In either case, advantageously in the step of unscrewing the screw from the threaded surface, the screw is completely unscrewed from the threaded surface for the purpose of freeing it from the second body. In this first preferred embodiment, it is also advantageous for the wedge to comprise a projection which defines the support surface.

b) In a second preferred embodiment, the support surface moves together with the second body and the threaded surface is suitable for moving together with the wedge. As will be seen in the examples, it basically consists of switching the support surface and the threaded surface. In this second embodiment, preferably the support surface is adjacent to the shank axis and is oriented according to the shank axis and downwardly and is suitable for retaining the head of a screw, where the support surface has free access, laterally with respect to the shank axis, suitable for introducing and removing said head of the screw; and very preferably the head of the screw has two arms arranged in a T shape and the support surface comprises two hooks, each of which is suitable for retaining one of the arms of the head. Another advantageous variant of this second embodiment is when in the step of unscrewing the screw from the threaded surface, the screw of the threaded surface is only partially unscrewed (i.e., it is not completely unscrewed) for the purpose of freeing the screw from the second body.

Another object of the invention consists of fixing means of the type indicated above, characterized in that they additionally comprise:

ratchet means arranged between said wedge and said first body, where said ratchet means are suitable for allowing relative movement between said wedge and said first body according to said axis of assembly and a downward direction and suitable for blocking the relative movement between said wedge and said first body according to said axis of assembly and an upward direction, a threaded surface that moves together with said second body, the axis of which coincides with said shank axis, a support surface in said wedge, said support surface being adjacent to said shank axis and oriented upwardly, where said support surface has free access above it in the direction of said shank axis. As will be seen below, this free access must allow the removal, once the fixing means are in their assembled position, of a screw arranged between the support surface and the threaded surface.

The threaded surface is preferably arranged in a threaded opening in said second body or in a nut that is solidly joined with said second body.

The support surface advantageously has an opening, closed around the perimeter, suitable for housing the screw. Said opening is preferably a mounting hole, i.e., an opening the cross section of which is not circular but rather elongated, such that it allows certain movement of the screw therein.

Also another object of the invention consists of fixing means of the type indicated above, characterized in that they additionally comprise:

ratchet means arranged between said wedge and said first body, where said ratchet means are suitable for allowing relative movement between said wedge and said first body according to said axis of assembly and a downward direction and suitable for blocking the relative movement between said wedge and said first body according to said axis of assembly and an upward direction, a support surface in said second body, said support surface being adjacent to said shank axis and oriented according to said shank axis and downwardly and being suitable for retaining the head of a screw, where said support surface has free access, laterally with respect to said shank axis, suitable for introducing and removing said head of the screw.

The support surface preferably comprises two hooks, each of which is suitable for retaining one arm of a head of a screw having a head with two arms arranged in a T shape.

In any of the embodiments of the present invention, the second body is, preferably, also C-shaped and in the assembled position both C's are back-to-back, i.e., the arms on one of the C's extending forwards and the arms of the other C extending backwards. The second body preferably has one of the arms of the C removably attached to the C (for example, screwed)

The fixing means usually sustain wear, strain, breakages, etc., during operation of the earth moving machine. Therefore, as in the wear part itself, they have to be periodically replaced with new fixing means (often together with the wear element, although this does not necessarily have to be the case). This results in the fixing means being able to be a sale unit by themselves and that, therefore, it is desirable to apply for the protection of the fixing means by way of the corresponding claims. In the present invention, the screw housed between the support surface and the threaded surface is removed before starting work with the earth moving machine, whereby the screw is not subjected to the working conditions of the bucket, i.e., it does not sustain the wear or the possible strain or breakages of the rest of the elements. Therefore, the fixing means according to the invention (understood as a supply unit) may or may not include the screw, both being advantageous options. Namely, the user will be able to purchase one unit formed by a first body, a second body, a wedge and a screw and a plurality of units each of them formed by a first body, a second body, and a wedge, but without the screw. The user will be able to use the same screw for assembling and dismantling all the units. thus, the manufacturers will offer for sale both units including the screw and units not including the screw. The screw itself is not, therefore, essential to the invention, since the invention may be supplied without the screw. In addition, in some preferred embodiments of the invention, the screw may be a conventional screw. On the other hand the supply unit can also include the wear element itself (once again, with or without the screw).

BRIEF DESCRIPTION OF THE DRAWINGS

Other advantages and features of the invention can be seen from the following description in which preferred embodiments of the invention are described in reference to the attached drawings with a non-limiting character. In the drawings.

DESCRIPTION DETAILED OF EMBODIMENTS OF THE INVENTION

Figure 1:
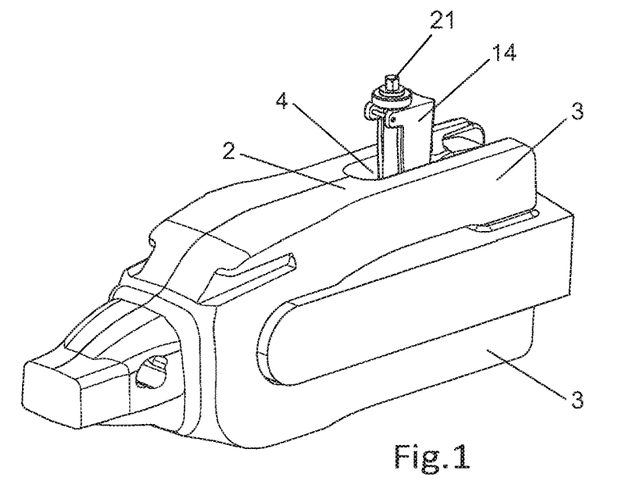
FIG. 1 shows a perspective view of a lip of a bucket, an adaptor and a first embodiment of fixing means according to the invention, in their assembled position.
Figure 2:
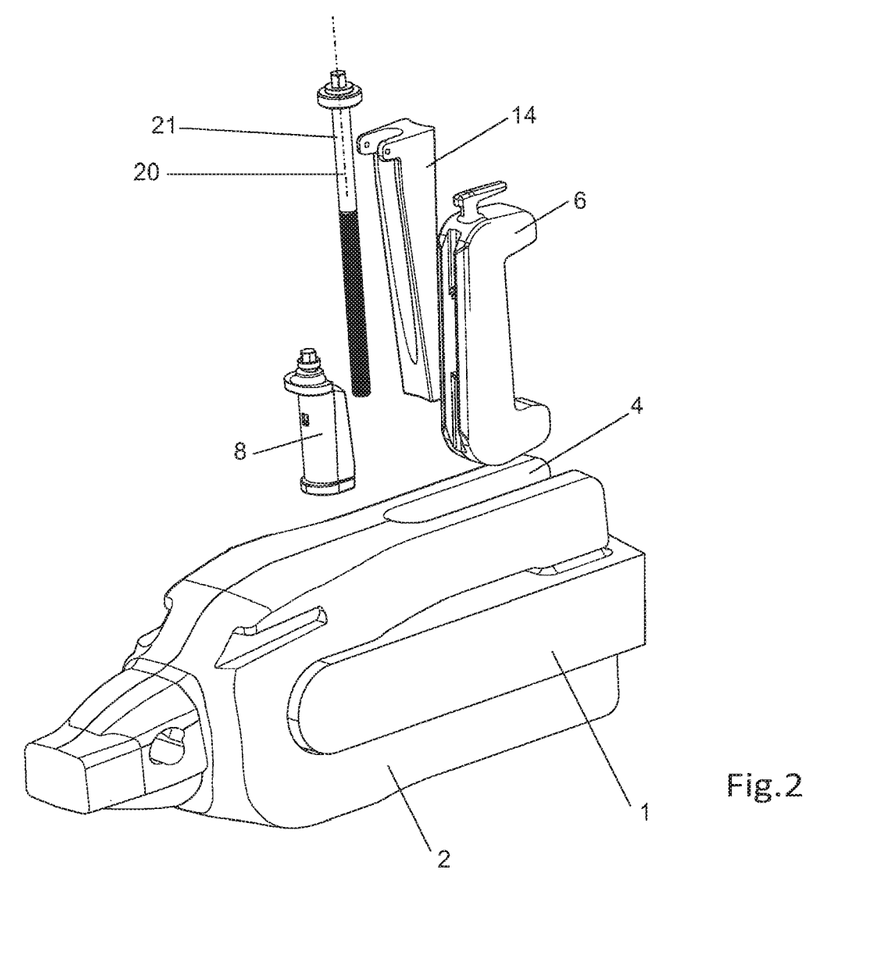
FIG. 2 shows an exploded perspective view of the assembly of FIG. 1.
Figure 3:
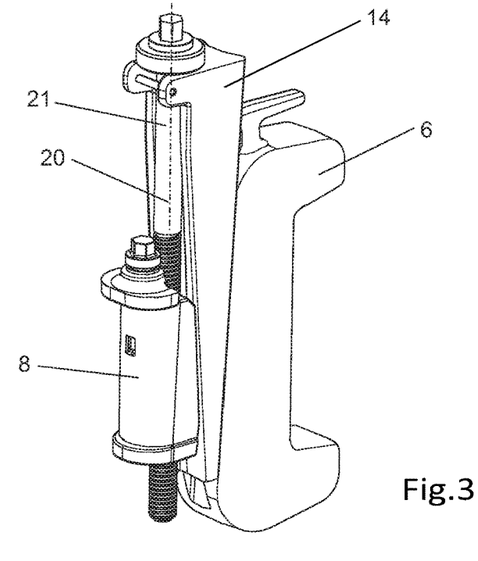
FIG. 3 shows a perspective view of the fixing means of FIG. 1, in the assembled position.
Figure 4:
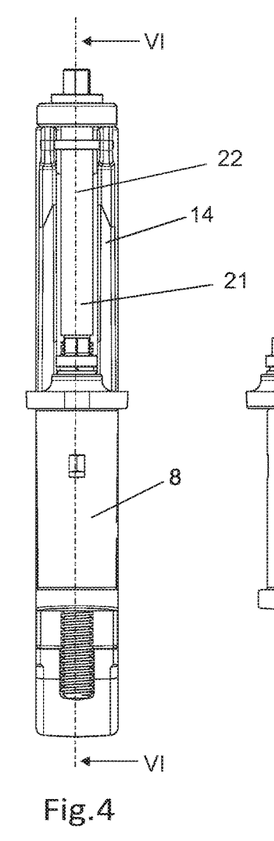
FIGS. 4, 5 and 6 show front elevational, side elevational and longitudinal section views (according to line VI-VI), respectively, of the fixing means of FIG. 3.
Figures 5, 6:
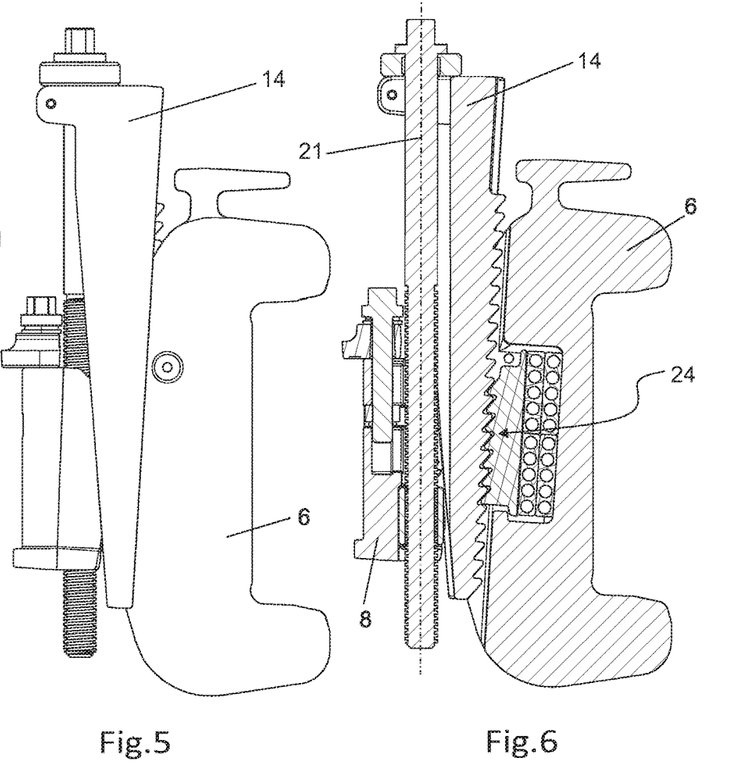
Figures 7, 8:
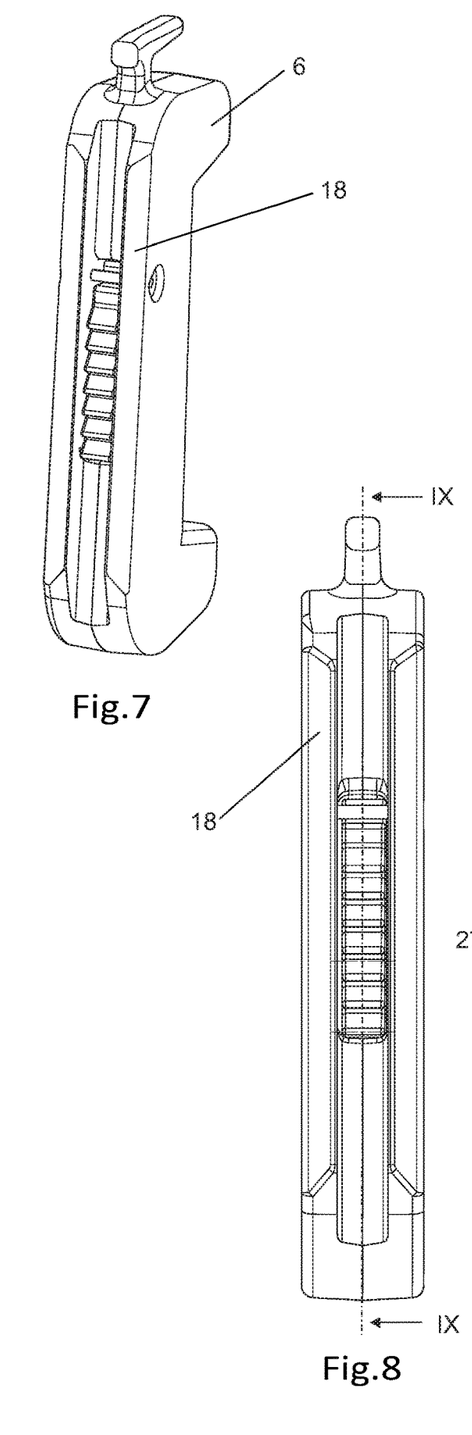
FIG. 7 shows a perspective view of the C-shaped first body of the fixing means of FIG. 3.
FIGS. 8 and 9 show front elevational and longitudinal section views (according to line IX-IX of FIG. 8), respectively, of the first body of FIG. 7.
Figure 9:
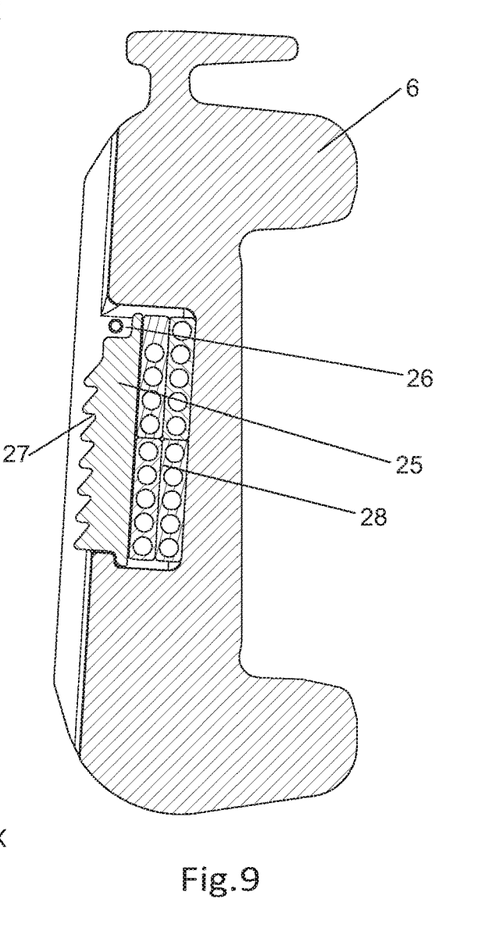
Figure 10:
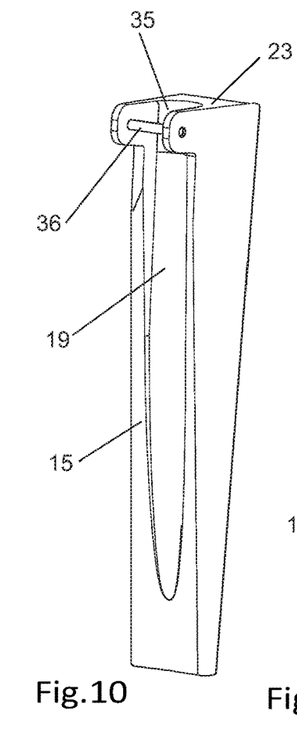
FIGS. 10 and 11 show front and rear perspective views, respectively, of the wedge of the fixing means of FIG. 3.
Figures 11, 12:
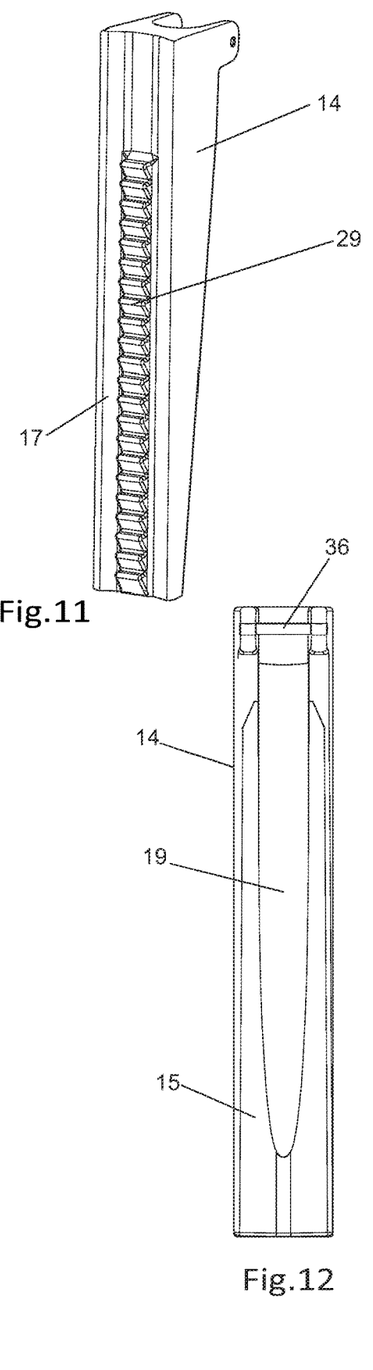
FIGS. 12 and 13 show front elevational and side elevational views, respectively, of the wedge of FIG. 10.
Figure 13:
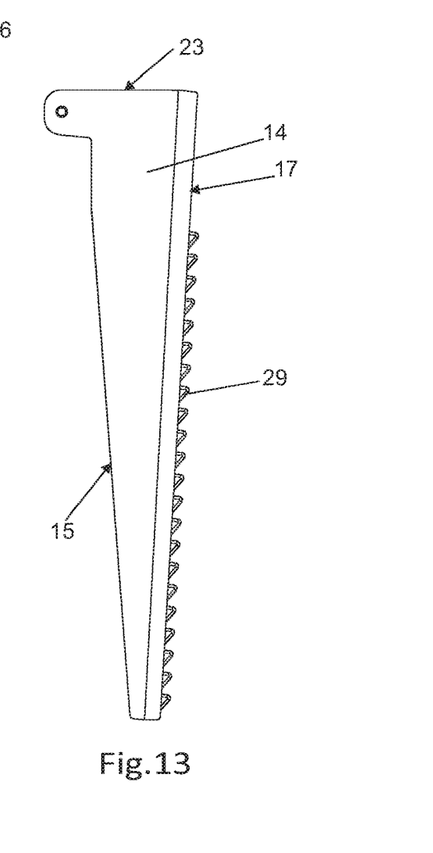
Figure 14:
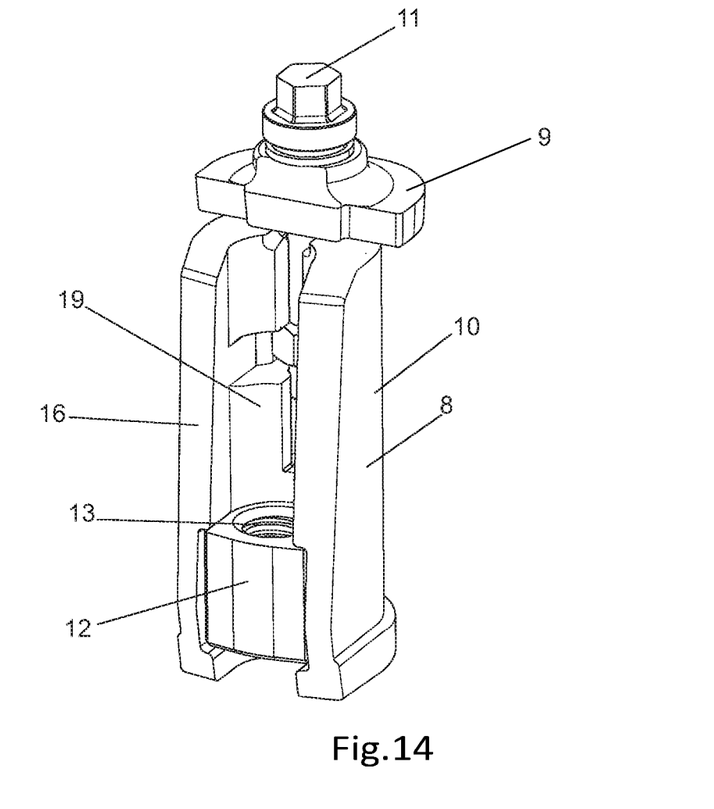
FIG. 14 shows a rear perspective view of the second body of the fixing means of FIG. 3.
Figures 15, 16:
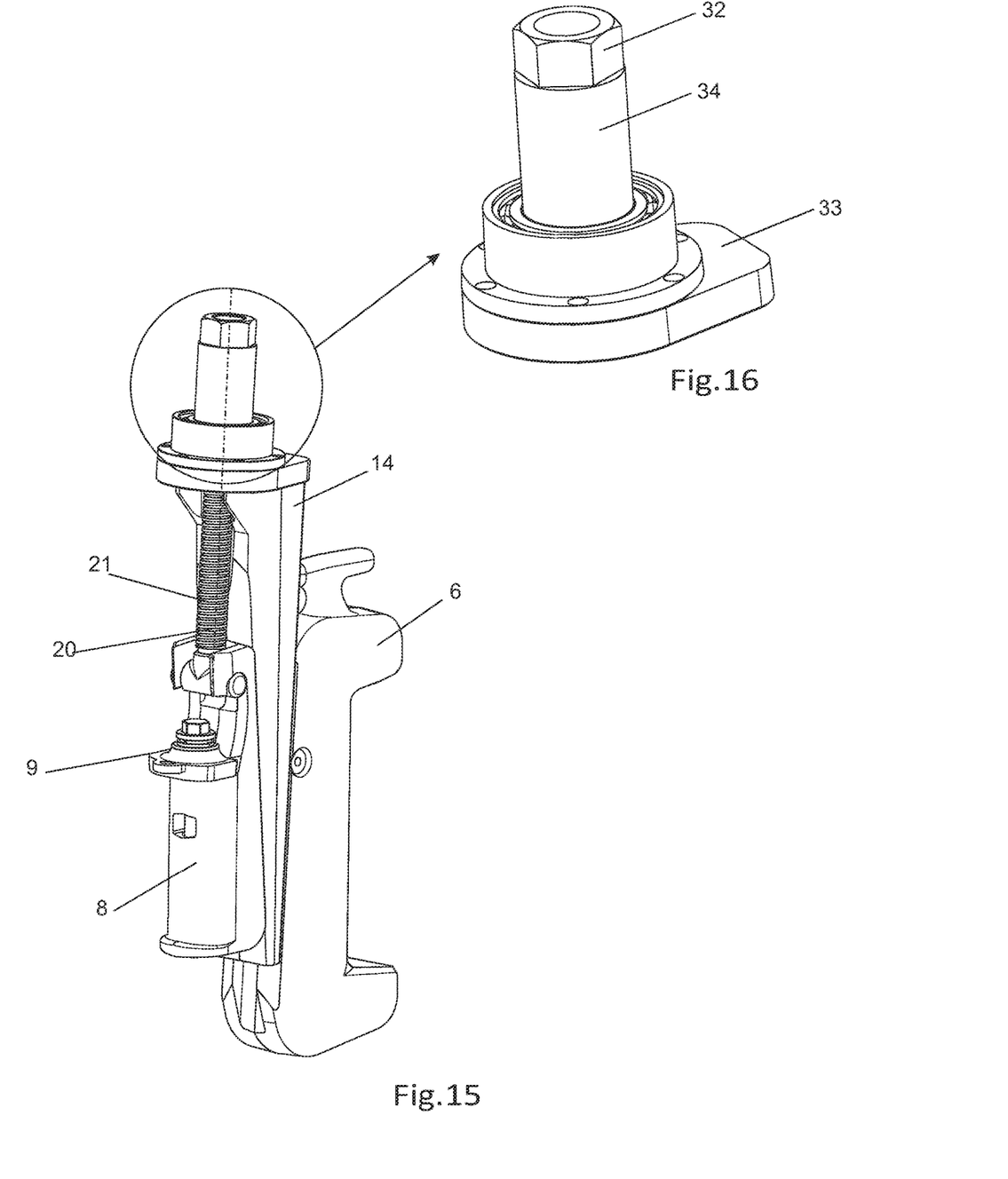
FIG. 15 shows a perspective view of a second embodiment of the fixing means according to the invention, in the assembled position.
FIG. 16 shows a partial perspective view of the upper portion of the fixing means of FIG. 15.
Figure 17:
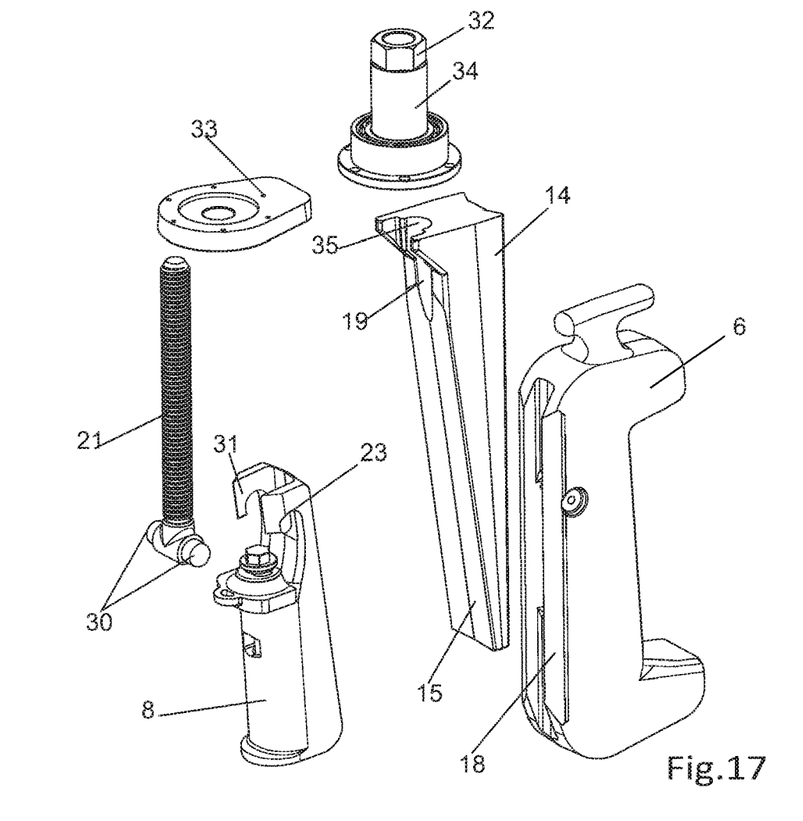
FIG. 17 shows an exploded perspective view of the assembly of FIG. 15.

FIGS. 1-14 show a first embodiment of the invention. To help explain the invention, it is assumed in the present description and claims that there is an "up" and a "down", as shown in FIGS. 1 and 2. In fact, this will be the most common actual position, but the invention is independent of the position in space adopted by the various elements participating in the invention. It also refers to a front portion (which is what corresponds with the direction of forward movement of the bucket and which, in FIGS. 1 and 2, is on the left) and a rear portion (oriented towards the inside of the bucket, on the right in FIGS. 1 and 2).

Figure 18:
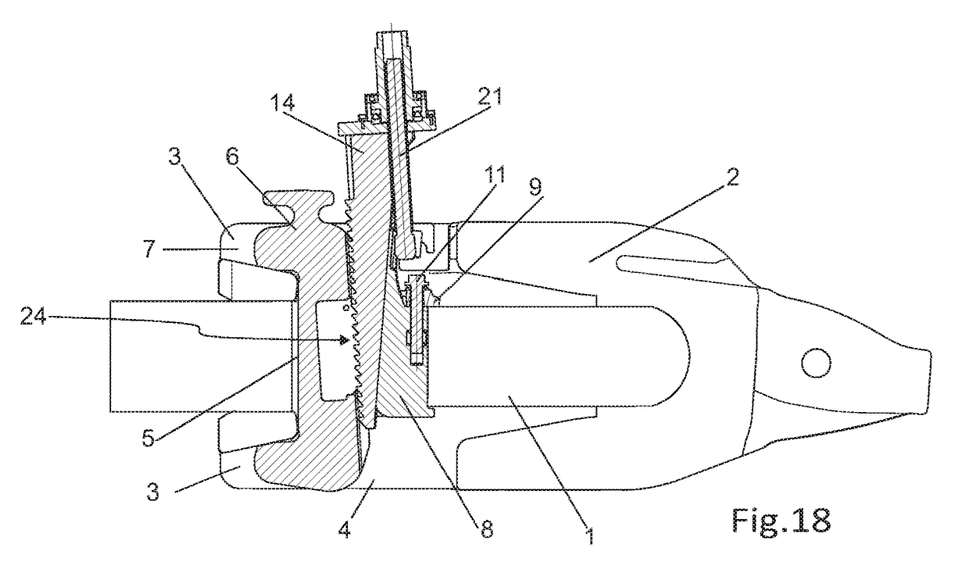
FIG. 18 shows a partially sectioned side elevational view of a lip of a bucket, an adaptor and the fixing means of FIG. 15, in their assembled position.

FIGS. 1 and 2 show the lip 1 (only partially depicted) of a bucket of an earth moving machine, acting as a support 1 of an adaptor 2, acting as a wear element 2. The adaptor 2 has two arms 3 extending backwards and opposite one another. Between the two arms 3 there is a space suitable for housing the front edge of the lip 1 when the adaptor 2 is in its assembled position. Each of the arms 3 has a first through opening 4 in the vertical direction. The lip 1 also has a through opening, referred to as second through opening 5. This second through opening 5 can be seen in FIG. 18, and while it corresponds to another preferred embodiment, it is identical to this first embodiment in relation to the support 1 (the lip 1) and the wear element 2 (the adaptor 2). In fact, one of the advantages of the present invention is that it can be implemented in conventional supports and wear elements. In the assembled position, the second through opening 5 is sandwiched between the first through openings 4, i.e., the three through openings 4, 5 are at least partially superimposed on one another. Therefore in the assembled position, the three through openings 4, 5 define an axis of assembly.

The fixing means comprise:

a) a C-shaped first body 6, the central segment of which in the assembled position is going through the three through openings 4, 5 and the two ends of the C are oriented backwards. Each of the ends of the C is housed in a housing 7 provided in each of the arms 3 of the adaptor 2 behind the first corresponding through opening 4. This can again be seen in FIG. 18, since the first body 6 is the same in both embodiments.

b) a second body 8 which, according to another preferred solution of the invention, is also C-shaped, and very preferably, its upper end 9 is detachable. In the present embodiment, the upper end 9 is a part that projects in front of the central segment 10 and is fixed thereto by means of a screw 11. As will be discussed below, an improved way of taking the assembly apart is thereby achieved. In the assembled position, the second body 8 is positioned such that the ends of the C are oriented forwards and "clamp" the lip 1 through the front portion of the second through opening 5. The second body 8 also comprises a nut 12 solidly joined therewith, with a threaded surface 13 therein.

c) a wedge 14 having a front side surface 15 parallel to the rear side surface 16 of the central segment 10 of the second body 8 and a rear side surface 17 parallel to the front side surface 18 of the central segment of the first body 6. There is located between the wedge 14 and the second body 8 a hollow space 19 suitable for housing the shank 20 of a screw 21. The shank 20, and therefore also the hollow space 19, define a shank axis 22. The axis of the nut 12 of the second body 8 coincides with the shank axis 22. At the upper end of the wedge 14 there is a support surface 23 which is adjacent to (and partially surrounds) the shank axis 22. This support surface 23 is oriented upwardly, such that it serves as a support for the head of the screw 21. In the assembled position, this support surface 23 has free access above it, such that it can be accessed to assembly, and particularly, disassembling the screw 21, as will be discussed below.

d) ratchet means 24 arranged between the wedge 14 and the first body 6. The substantially consist of: [I] a block 25 housed in a cavity 26 of the first body 6 and having a toothed surface 27 oriented towards the wedge 14 and elastic means 28 in the bottom of the cavity 26, and [II] a toothed surface 29 arranged in the rear side surface 17 of the wedge 14, where the toothed surface 29 of the wedge 14 and the toothed surface 27 of the block 25 of the first body 6 are in contact with one another. The teeth have an asymmetrical geometry, such that they allow the wedge 14 to move downwardly (i.e., according to the axis of assembly and in the downward direction) but block a possible upward movement of the wedge 14.

The method of fixing the wear element 2 (the adaptor 2) on the support 1 (the lip 1) is in accordance with the following steps:

the adaptor 2 is positioned on the lip 1, such that the three through openings 4, 5 coincide (at least partially).

the first body 6 and the second body 8 are introduced in the three through openings 4, 5. The first body 6 moves backwards, such that it is fixed in the adaptor 2 and the second body 8 moves forward such that it is fixed on the lip 1. Therefore neither the first body 6 nor the second body 8 can move in the direction of the axis of assembly. To block them in this position it is necessary to insert the wedge 14, which is the following step.

the wedge 14 is inserted between the first body 6 and the second body 8.

a screw 21 is positioned in the hollow space 19 with its head in contact with the support surface 23 and with its threaded end in the nut 12.

the screw 21 is screwed into the nut 12, such that the wedge 14 moves, according to the axis of assembly, with respect to the second body 8.

These steps do not have to be strictly sequential nor do they have to be followed strictly in the indicated order. For example, the screw 21 can be positioned in the wedge 14 before introducing the wedge 14 between the first body 6 and the second body 8. It is also possible to make a pre-assembly (wedge 14+screw 21+second body 8), with the screw 21 slightly screwed into the nut 12, and then insert the assembly into the three through openings 4, 5. Other variants are also possible.

The screw 21 is screwed into the nut 12 until the wedge 14 reaches its assembled position. In the assembled position, the wedge 14 is press fitted between the first body 6 and the second body 8.

Now the fixing means are in their assembled position. The first body 6 holds the adaptor 2 and tightens it backwards, the wedge 14 prevents both the first body 6 and the second body 8 from coming out of their assembled position, and the ratchet means 24, on one hand, together with the second body 8, on the other, keep the wedge 14 in its assembled position. Therefore, the screw 21 has performed its function (moving the wedge 14 to its assembled position without having to use a hammer) and does not perform any additional function, since it is not necessary for retaining the wedge 14 in its assembly position. Therefore, it is now possible to completely unscrew the screw 21 from the nut 12, freeing it from the second body 8 and the wedge 14 and removing it from the fixing means. To that end, as previously indicated, it is necessary for the support surface 23 to have free access above it in the direction of the shank axis 22. Therefore, the head of the screw 21 (or generally, the portion of the screw resting on the support surface 23) can move upwardly, in the direction of the shank axis 22, without any obstacle until complete removal of the screw 21.

FIGS. 15 to 18 show a second preferred embodiment of the invention. This second embodiment shares many elements in common with the first embodiment (lip 1, adaptor 2, first body 6, ratchet means 24, etc.) which therefore will not be described again. The differences are primarily in the wedge 14 and the second body 8, and the screw 21. Conceptually, the basic difference lies in the fact that the position of the screw 21 has been "inverted" (the head is in the lower portion) and the positions of the support surface 23 (which is now in the second body 8) and the threaded surface 13, which is now solidly joined (at least in the "downward" direction, which is the direction of interest in the present invention) with the wedge 14, have been switched.

In this second embodiment the screw 21 has a T-shaped head, with two rounded arms 30 extending perpendicular to the shank axis 22. In turn, the second body 8 has a support surface 23 which is oriented according to the shank axis 22 but downwardly. Furthermore, the support surface 23 is not planar, but rather curved, suitable for retaining the head of the screw 21. Specifically, the support surface 23 comprises two hooks 31, each of which is suitable for housing one of the arms 30 of the head of the screw 21. However, it must be noted that this specific geometry is not indispensable: the invention would also work even if the screw 21 had a "conventional" head or a head with a ring similar to that of the first embodiment, and the support surface 23 was smooth.

In turn, on the wedge 14 there is a nut 32 resting on the upper face of the wedge 14 (through a ring 33 and a sleeve 34 which are not indispensable for the embodiment of the invention, though their inclusion is advantageous). The nut 32 acts as the threaded surface 13 of the first embodiment.

The method of fixing of this second embodiment is the following:

as in the preceding case, the adaptor 2 is positioned on the lip 1 such that the three through openings 4, 5 coincide (at least partially), and the first body 6, the second body 8 and the wedge 14 are introduced in the three through openings 4, 5 in the same way already discussed.

the screw 21 is positioned in the hollow space 19 with the arms 30 of its head housed in the hooks 31 of the second body 8 and its end is screwed into the nut 32, such that the wedge 14 moves, according to the axis of assembly, with respect to the second body 8. In this case, the support surface 23 is integral with the second body 8 and the nut 32, which comprises the threaded surface 13, moves together with the wedge 14.

Like in the preceding example, these steps do not have to be strictly sequential nor do they have to be followed strictly in the indicated order.

the screw 21 is screwed into the nut 32 until the wedge 14 reaches its assembled position.

Now the fixing means are in their assembled position and again the screw 21 no longer performs any function, so it can be removed. To that end, it is enough to only partially unscrew the nut 32 enough to allow freeing the arms 30 from the hooks 31. Therefore, it is now possible to unscrew the screw 21 from the nut 32, freeing it from the second body 8 and the wedge 14 and removing it from the fixing means. The only thing that has to be taken into account during the stage of designing the fixing means is that there must be enough room for removing the head of the screw 21 through the hollow space 19 and the three through openings 4, 5.

As can be seen, in this embodiment the threaded surface 13 (the nut 32) does not have to be part of the invention. As discussed above in relation to the screw 21, in the present embodiment the nut 32 (generally, the threaded surface 13) is an element that can be reutilized, so in some cases, it will be advantageous for it to be part of the fixing means (as a supply unit), whereas in other cases, it will be advantageous for the "fixing means" supply unit to not include this nut 32 (generally, to not include the threaded surface 13).

In any of the preceding embodiments, removal of the fixing means (for example, to replace the adaptor 2) is done as follows: the upper end 9 of the second body 8 is disassembled (by disassembling the screw 11 fixing it to the central segment 10) and the second body 8 is taken out through the lower portion of the adaptor 2. The wedge 14 is therefore freed and can also be removed, as well as the first body 6.

Generally, in any of the embodiments of the present invention, the wedge 14 must be inserted between the first body 6 and the second body 8. To that end, it must perform a movement according to the axis of assembly. This movement is achieved as a result of screwing the screw 21 into the threaded surface 13. It is not necessary for the axis of assembly and the shank axis 22 to coincide or even be parallel to one another. In fact, in the examples shown in the drawings, and given that the front side surface 15 of the wedge 14 and the rear side surface 16 of the central segment 10 of the second body 8 form a non-zero angle with the shank axis 22, when the wedge 14 moves with respect to the second body 8, it is inevitable for the shank axis 22 to rotate with respect to the axis of assembly during the movement of insertion of the wedge 14. In practice, this rotation is small but has the consequence of generating a force that tends to move the screw 21 forwards. Therefore, an advantageous alternative embodiment of the invention includes the support surface 23 having an opening 35, closed around the perimeter (for example, as a result of a pin 36), suitable for housing the screw 21, as shown in the first embodiment (FIGS. 1 to 14). Alternatively, another advantageous solution consists of allowing the screw 21 to move forwards, making the opening 35 a mounting hole, or even an opening that is open in the front portion, as shown in the second embodiment (FIGS. 15 to 18). Another additional advantageous solution is when the fixing means comprise rotation means which allow relative rotation between the threaded surface 13 and the second body 8 and/or between the head of the screw 21 and the support surface 23, as is also shown in the second embodiment (FIGS. 15 to 18).

The invention claimed is:

1. A method of fixing a wear element on the front edge of a support using fixing means, where said wear element comprises two arms extending backwards opposite one another, leaving a space therebetween for housing said front edge, thereby defining an assembled position, where said arms have first through openings facing one another, and said support has a second through opening which is sandwiched between said first through openings in said assembled position, where said first and second through openings define an axis of assembly in said assembled position, where said fixing means comprise a C-shaped first body, a wedge and a second body, where in said assembled position, said first body, said wedge and said second body are housed in said openings, said wedge being located between said first body and said second body, and where, in said assembled position, there is located between said wedge and said second body a hollow space suitable for housing the shank of a screw, said hollow space defining a shank axis coinciding with the axis of said shank, the method comprises the following steps:
positioning said first body and said second body in said openings in their assembled position,
inserting said wedge between said first body and said second body, where between said first body and said wedge there are ratchet means suitable for allowing relative movement between said wedge and said first body according to said axis of assembly and a downward direction and suitable for blocking the relative movement between said wedge and said first body according to said axis of assembly and an upward direction,
positioning a screw in said hollow space with its head in contact with a support surface and with its threaded end on a threaded surface, where said support surface is suitable for moving together with said wedge and said threaded surface moves together with said second body, or alternatively, said support surface moves together with said second body and said threaded surface is suitable for moving together with said wedge,
screwing said screw into said threaded surface such that said wedge moves, according to said axis of assembly, with respect to said second body and said first body until said wedge reaches its assembled position, and
at least partially unscrewing said screw from said threaded surface, freeing said screw from said second body and from said wedge and removing said screw from said fixing means.

2. The method according to claim 1, wherein said support surface is suitable for moving together with said wedge and said threaded surface moves together with said second body.

3. The method according to claim 2, wherein said threaded surface defines a screwing axis coinciding with said shank axis.

4. The method according to claim 2, wherein said threaded surface is arranged in a threaded opening in said second body.

5. The method according to claim 2, wherein said threaded surface is arranged in a nut solidly joined with said second body.

6. The method according to claim 2, wherein in said step of unscrewing said screw from said threaded surface, said screw is completely unscrewed from said threaded surface for the purpose of freeing said screw from said second body.

7. The method according to claim 2, wherein said wedge comprises a projection defining said support surface.

8. The method according to claim 1, wherein said support surface moves together with said second body and said threaded surface is suitable for moving together with said wedge.

9. The method according to claim 8, wherein said support surface is adjacent to said shank axis and is oriented according to said shank axis and downwardly and is suitable for retaining the head of a screw, where said support surface has free access, laterally with respect to said shank axis, suitable for introducing and removing said head of the screw.

10. The method according to claim 9, wherein said head of the screw has two arms arranged in a T shape, and said support surface comprises two hooks each of which is suitable for retaining one of the arms of said head.

11. The method according to claim 8, wherein in said step of unscrewing said screw from said threaded surface, said screw is only partially unscrewed from said threaded surface for the purpose of freeing said screw from said second body.

12. A fixing means for fixing a wear element on the front edge of a support, where said wear element comprises two arms extending backwards opposite one another, leaving a space therebetween for housing said front edge, thereby defining an assembled position, where said arms have first through openings facing one another and said support has a second through opening which is sandwiched between said first through openings in said assembled position, where said first and second through openings define an axis of assembly in said assembled position, where said fixing means comprise a C-shaped first body, a wedge and a second body, where in said assembled position, said first body, said wedge and said second body are housed in said openings, said wedge being located between said first body and said second body, and where in said assembled position, there is located between said wedge and said second body a hollow space suitable for housing the shank of a screw, said hollow space defining a shank axis coinciding with the axis of said shank, the fixing means additionally comprises:
- ratchet means arranged between said wedge and said first body, where said ratchet means are suitable for allowing relative movement between said wedge and said first body according to said axis of assembly and a downward direction and suitable for blocking the relative movement between said wedge and said first body according to said axis of assembly and an upward direction,
- a threaded surface that moves together with said second body, the axis of which coincides with said shank axis, and
- a support surface in said wedge, said support surface being adjacent to said shank axis and oriented upwardly, where said support surface has free access above it in the direction of said shank axis.

13. The fixing means according to claim 12, wherein said threaded surface is arranged in a threaded opening in said second body.

14. The fixing means according to claim 12, wherein said threaded surface is arranged in a nut solidly joined with said second body-.

15. The fixing means according to claim 12, wherein said support surface has an opening, closed around the perimeter, suitable for housing said screw-.

16. A fixing means for fixing a wear element on the front edge of a support, where said wear element comprises two arms extending backwards opposite one another, leaving a space therebetween for housing said front edge, thereby defining an assembled position, where said arms have first through openings facing one another and said support has a second through opening which is sandwiched between said first through openings in said assembled position, where said first and second through openings define an axis of assembly in said assembled position, where said fixing means comprise a C-shaped first body, a wedge and a second body, where in said assembled position, said first body, said wedge and said second body are housed in said openings, said wedge being located between said first body and said second body, and where in said assembled position, there is located between said wedge and said second body a hollow space suitable for housing the shank of a screw, said hollow space defining a shank axis coinciding with the axis of said shank, the fixing means additionally comprises:
- ratchet means arranged between said wedge and said first body, where said ratchet means are suitable for allowing relative movement between said wedge and said first body according to said axis of assembly and a downward direction and suitable for blocking the relative movement between said wedge and said first body according to said axis of assembly and an upward direction, and
- a support surface in said second body, said support surface being adjacent to said shank axis and oriented according to said shank axis and downwardly and being suitable for retaining the head of a screw, where said support surface has free access, laterally with respect to said shank axis, suitable for introducing and removing said head of the screw.

17. The fixing means according to claim 16, wherein said support surface comprises two hooks each of which is suitable for retaining an arm of a head of a screw having a head with two arms arranged in a T shape.

* * * * *